Figure 1:
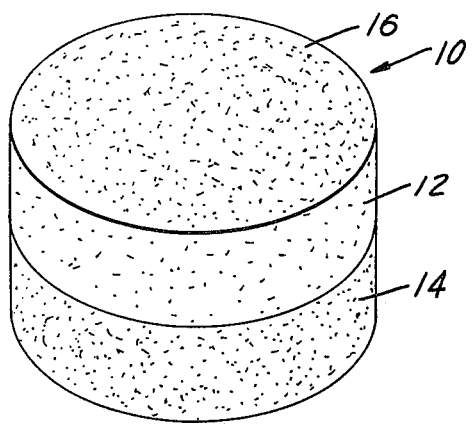

United States Patent [19]

Akrongold et al.

[11] 3,949,137
[45] Apr. 6, 1976

[54] GEL-IMPREGNATED SPONGE

[76] Inventors: Harold S. Akrongold; Rochelle Akrongold, both of 39 Cathay Road, East Rockaway, L. I., N.Y.

[22] Filed: Sept. 20, 1974

[21] Appl. No.: 507,757

[52] U.S. Cl. ............. 428/311; 264/46.4; 427/244; 428/315
[51] Int. Cl.² .......................................... B32B 3/26
[58] Field of Search ................ 428/310, 311, 315; 427/244, 430, 434; 264/46.4

[56] References Cited
UNITED STATES PATENTS

| | | | |
|---|---|---|---|
| 3,360,415 | 12/1967 | Hellman et al. | 161/161 |
| 3,377,643 | 4/1968 | Teng et al. | 161/159 |
| 3,396,419 | 8/1968 | Richter et al. | 161/159 |
| 3,464,872 | 9/1969 | Everett | 161/159 |
| 3,665,918 | 5/1972 | Lindquist et al. | 161/159 |
| 3,720,574 | 3/1973 | Kunc | 161/190 |
| 3,728,206 | 4/1973 | Buese | 161/159 |

*Primary Examiner*—William J. Van Balen
*Attorney, Agent, or Firm*—Arthur A. Jacobs

[57] ABSTRACT

A gel-impregnated sponge having at least two layers of which at least one layer is impregnated with a hardened gel material and at least one layer is unimpregnated sponge material, the impregnated layer having a fibrous or fur-like coating on its outer surface areas.

11 Claims, 4 Drawing Figures

U.S. Patent  April 6, 1976  3,949,137

GEL-IMPREGNATED SPONGE

This invention relates to a shaped article comprising a gel-impregnated sponge, and it particularly relates to a gel-impregnated sponge having at least two layers of which at least one layer is gel-impregnated and at least one layer is substantially free from gel-impregnant in the dry state.

A particular embodiment of the present invention comprises a molded or shaped body, which, preferably but not necessarily, has curved or rounded corners, and which is partially impregnated by a solidified gel having detergent or washing properties. The terms "detergent" or "washing" properties include both certain synthetic detergents and natural washing agents such as soap.

In making this molded or shaped body, a sponge is used which is either partially or fully reticulated. The term "fully reticulated" means that it contains pores or channels separated from each other only by thin membranes or walls. The term "partially reticulated" means that although the pores are separated from each other only by thin membranes or walls, some of the pores have membranes stretching across them so that they are closed or blocked by these membranes. Generally, the fully reticulated sponge should have between about 70 to about 200 pores per square inch (ppi) while the partially reticulated sponge should have between about 30 to about 200 ppi. The upper limit of 200 is not critical but is used because it is difficult to make a sponge with more pores per square inch. However, the lower limit is important for the reasons to be hereinafter explained.

In making the product, the gel material is initially in a heated liquified state and, while in such liquid state, is poured into a mold which may be of disk-like or any other desired shape. The sponge is then pressed into the liquid from the open top of the mold until the bottom of the sponge is in contact with the bottom of the mold, at which position the upper portion of the sponge extends above the mold.

The liquid, which is no longer subject to heat, begins to harden in the mold. However, before the final surface solidification of the gel, the sponge is removed from the mold and reversed. In its reversed position it is placed on a surface to dry. When so reversed, the liquid flows away from the previously immersed surfaces and collapses toward the center of gravity. During this action, the liquid flows slightly inward from each of the exposed surfaces (usually about 1/32 of an inch) leaving the original sponge area substantially free of liquid on all the surfaces that have been immersed. These surfaces now resemble the sponge surfaces prior to their immersion in the liquid, having a fibrous or fur-like texture.

This is a highly important step because, ordinarily, if the liquid is allowed to harden completely within the mold before the article is removed, the immersed surfaces become tacky or waxy to the touch, making them difficult, or at least annoying, to handle.

It is generally desirable to obtain a layered construction whereby a portion of the sponge is free from solidified gel. This is most important when the article is used for washing purposes such as cleaning the skin or as a substitute for the ordinary sponge and soap in the bath because, when wet, the soft, unimpregnated sponge layer acts in the same manner as an ordinary sponge while the gel in its lower portion is dissolved by the water and flows through the sponge to the skin. The gel-impregnated sponge, therefore, acts both as a sponge and as a soap or detergent bar.

In order to keep the upper portion of the article free of hardened gel, it is necessary to prevent the gel, while in its liquid state, from flowing through the pores of the upper portion of the sponge and permeating it. It is for this reason that the above-noted ranges of porosity are important. In a fully reticulated sponge (i.e. where the pores are about 99.1–100% free from blocking membranes), where the sponge contains at least about 70 ppi, the pores are so small that as the heated liquid flows through, there is a substantially large amount of sponge surface area available to absorb the heat, whereby the liquid cools quickly. Furthermore, the air is trapped in the pores and acts as a piston to retard the flow of the liquid into the unimpregnated sponge area, so that there is sufficient time for heat transferrence to take place from the liquid to the entrapped air, thereby permitting effective gelation at the interface layer. This gelation prevents further penetration of the liquid into the unimpregnated sponge area.

When using partially reticulated sponge material, the ppi may be as low as about 30 because in such material, the membrane-covered pores act to block the upward passage of the liquid. This plus the cooling effect of the open pores described above, prevents permeation of the upper sponge layer.

It is also possible to effectively utilize a fully reticulated sponge with a ppi as low as about 40 if an additional step is used. This additional step consists of using a mold having apertures therein through which jets of air or similar gas is blown. This air acts both as a counterforce to the flow of the liquid and as a coolant to aid in its rapid gelation. It is also possible to utilize sponges of lower porosity if the gel point of the liquid is controlled by the addition of additives or the like, but this is less preferable because such additives could affect the purity of the gel.

If a plurality, such as three layers, are desired, the article formed in the above manner, can then be reversed in the mold so that the gel-free sponge portion is now partially impregnated with a gel. In this manner, an article is produced having top and bottom gel-impregnated portions and a central layer free of gel. This process may be used to obtain an article having three different colors, as for example, a red pigmented gel can be used for the first gelation step and a blue pigmented gel can be used for the second gelation step so that if the sponge itself is white, a red, white and blue article is produced. Such article does not have the soft sponge-like quality at one side but is still useful as a washing or cleansing bar or may be used for any other desirable purpose.

The sponge material may be any such material that is feasible for the invention. Such materials may include polyester and polyether polyurethane foams, polyolefin foams such as polypropylene and polyethylene foams, latex and natural rubber foams, silicate foams, ceramic foams, cellulose sponges, etc. The preferred sponge material for use in washing or cleansing articles comprises the polyurethane foams of the polyether type because polyether is stable to surfactants such as soap and synthetic detergents. These foams are standard materials available on the open market and need not, therefore, be described in any further detail here since, by themselves, they form no part of the present invention.

3

The gel material may be any material that is liquid in one state, such as when heated, and then gels and hardens in a second state, as when cooled. Such materials include soap gels, detergent gels, polymer gels, thermoplastics, and the like. The basic requirement is that they be liquid and capable of pouring below the melting or deterioration point of the sponge material being used. These gel materials are also standard materials which need not be described in detail herein because they, too, are generally standard and available on the open market, and, therefore, by themselves, form no part of the present invention.

Referring now more particularly to the drawings, there is shown in

FIG. 1 a perspective view of a shaped washing bar, generally designated 10, having an upper layer 12 of soft sponge material which is unimpregnated, and a lower layer 14 which is the same sponge material that has been impregnated with a detergent gel that has hardened in situ in a mold. The upper and peripheral surfaces of the layer 12, are provided with a fibrous or furry coating designated 16.

Figure 2:
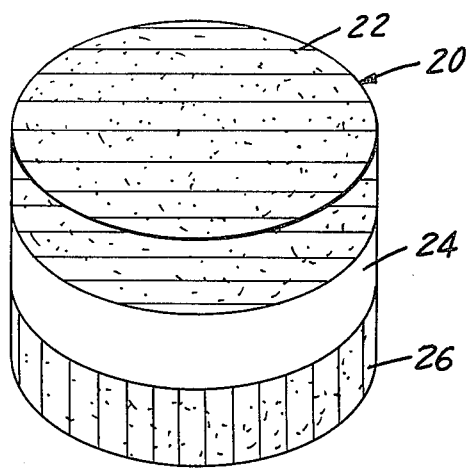

FIG. 2 is a perspective view of a shaped body, generally designated 20, similar to that shown in FIG. 1 except that it has been made by first impregnating one end and then reversing it in the mold and impregnating the other end. The upper layer 22 is shown as being colored blue, the center layer 24 is the original white sponge, and the lower layer 26 is colored red.

Figure 3:
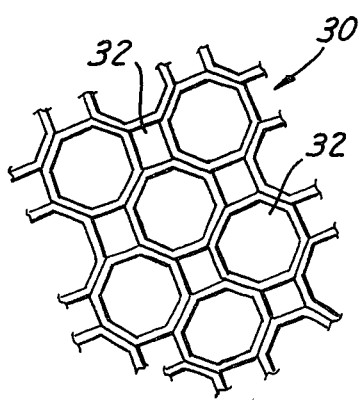

FIG. 3 is a somewhat schematic, greatly enlarged cross-sectional view of a portion of a reticulated sponge material, generally designated 30, showing the open pores 32.

Figure 4:
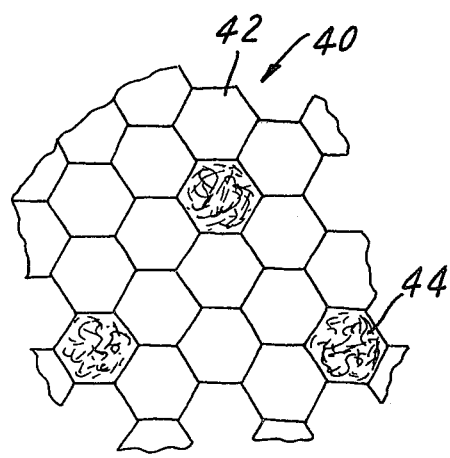

FIG. 4 is a view, similar to FIG. 3, which shows a partially recticulated sponge material, generally designated 40, having open pores 42 and closed pores 44 having membranes stretched across them. Actually, there may be far less closed pores than shown in FIG. 4, but this figure is provided merely to illustrate the general concept of closed and open pores.

As indicated above, the sponge material may be selected from a wide variety depending on the product desired to be produced, although the polymer foams, such as polyurethane foams, are preferred. An example of a partially reticulated polyether type polyurethane foam is the so-called "Nerf" foam (Okenel Corp., Lyndhurst N.J.), while an example of a fully reticulated polyether type polyurethane foam is "Scott Foam" (Scott Paper Co., Chester, Pa.). The Nerf foam has a ppi of about 50–60, while the Scott Foam has a ppi of about 70–120 ppi.

The following examples are illustrative of the present invention:

EXAMPLE 1

A formulation of the gel material was made with the following components:

| Components | Percent by Wt. |
|---|---|
| "Miranol acid (C2M)" (Miranol Chemical Co.) | 12.0 |
| ricinoleic acid | 12.0 |
| diethanolamine | 30.0 |
| sodium stearate | 26.0 |
| sodium lauryl sulfate (powder) | 10.0 |
| "Shercomid CDO" (diethanolamide of mixed fatty acids - Sher | |

4

| Components -continued | Percent by Wt. |
|---|---|
| Bros., Clifton, N.J.) | 10.0 |

The two acids were mixed together with the diethanolamine to 110°C with agitation. While maintaining the agitation and the temperature at 110°C, the sodium stearate was added, and then the remainder of the components were added at the same temperature and while under agitation.

The resulting liquid was poured into a mold and a sponge formed of Scott Foam (100 ppi) was inserted into the liquid-filled mold with the upper portion of the sponge extending upwardly from the mold. The impregnated sponge was then removed from the mold before the liquid was completely solidified. Prior to solidification, the impregnated sponge was reversed and placed on a surface to dry with the impregnated layer on top and the unimpregnated layer at the bottom. Thereafter, final solidification took place outside the mold. The resulting product had fur-like, non-waxy, outer surfaces where the sponge had been impregnated, while the unimpregnated portion retained its original soft texture.

The same liquid composition was used in the same type of mold and in the same manner to impregnate (a) Nerf foam, and (b) a cellulose sponge, both of which are partially reticulated, the Nerf foam having a ppi of 50 while the cellulose sponge had a ppi of 30.

EXAMPLE 2

| Components | Percent by Wt. |
|---|---|
| diethanolamine | 25.0 |
| ricinoleic acid | 12.0 |
| sodium stearate | 25.0 |
| "Maprofix TLS-65" (triethanolamine lauryl sulfate-Onyx Chem. Co., Jersey City, New Jersey) | 23.0 |
| "Shercomid CDO" | 15.0 |

The diethanolamine and the ricinoleic acid were heated together at 95°C with agitation. The sodium stearate was then slowly added, while maintaining the temperature at 95°C. Then, at the same temperature and while maintaining agitation, the remaining components were added. The resultant liquid, which was red in color, was then poured into a mold, while still at 95°C, and a Scott Foam sponge, having a ppi of 100, was inserted and then removed prior to complete hardening of the gel in the same manner as in Example 1.

The same types of Nerf foam and cellulose sponge as in Example 1 were treated in the same manner.

EXAMPLE 3

A gel material was formed with the following composition:

| Components | Percent by Wt. |
|---|---|
| "Unimide JJ 72-3" (diethanolamide) (Lonza, Inc., Fair Lawn, N.J.) | 30.0 |
| "Miranol acid (C2M)" | 10.0 |
| isostearic acid | 5.0 |
| "Emerez 1535" (polymerized fatty acid polyamide-Emery Industries, Inc., Cincinnati, Ohio) | 25.0 |
| "Standopol 7021 Conc." (mixture of di-and tri-ethanolamine | |

| Components | Percent by Wt. |
|---|---|
| lauryl sulfate - Henkel Chem. Co.) | 30.0 |

All the components except the "Standopol" were heated to 140°C under agitation, after which the Standopol was added with agitation.

The same type sponges and treatments were used as in Example 1 with the same results.

EXAMPLE 4

A gel material was made with the following composition:

| Components | Percent by Wt. |
|---|---|
| "Shercomid CDO" | 20.0 |
| "Unirez 2930" (polymerized fatty acid) (Union Camp Corp., Wayne, N.J.) | 18.0 |
| "Standopol 7021 Conc." | 54.0 |
| "Polectron 450" (N-vinylcarbazole polymer) (GAF, New York, N.Y.) | 8.0 |

The "Shercomid" was heated to 135°C, at which time the "Unirez" was added. The temperature was then lowered to 90°C and, at this temperature, the Standopol was added. The temperature was then lowered to 75°C at which time the "Polectron" was added and the liquid turned white.

The same type sponge materials as in Example 1, were treated in the same manner. In addition, a ceramic foam and a nylon foam were also treated in the same manner and with the same results.

The invention claimed is:

1. A shaped article comprising a unitary sponge body having a selected porosity, said sponge body being impregnated with a solidified gel material, said gel material extending throughout the interior of the sponge body but being spaced from the exposed surface areas of said sponge body, said exposed surface areas being free of said solidified gel material.

2. The article of claim 1 wherein the sponge is fully reticulated.

3. The article of claim 1 wherein the sponge is partially reticulated.

4. The article of claim 1 wherein the sponge has at least about 30 pores per square inch.

5. The article of claim 1 wherein the gel material is a surfactant selected from the group consisting of soap and synthetic detergents.

6. The article of claim 1 wherein the sponge is a polyether-polyurethane foam.

7. A method of making a shaped article which comprises inserting a gel-forming material into a mold at a temperature at which said material is in the liquid state, immersing a sponge into the gel-forming material in the mold while said material is still in the liquid state, removing the sponge, which has been impregnated with the material during immersion, from the mold before solidification of said material has been completed, reversing the impregnated sponge, while maintaining said sponge free from compressive pressure, to permit the material, while still in its liquid state, to collapse inwardly from the immersed surface areas of the sponge, and then allowing the impregnated sponge to cool to complete solidification of said material below said surface areas.

8. The method of claim 7 wherein the sponge is fully reticulated.

9. The method of claim 7 wherein the sponge is partially reticulated.

10. The method of claim 7 wherein the sponge has at least about 30 pores per square inch.

11. The method of claim 7 wherein the sponge is a polyether-polyurethane foam.

* * * * *